(12) United States Patent
Bertram

(10) Patent No.: US 7,975,280 B2
(45) Date of Patent: Jul. 5, 2011

(54) METHOD AND APPARATUS FOR PERFORMING IMPULSE AUTHORIZATIONS WITHIN A VIDEO ON DEMAND ENVIRONMENT

(75) Inventor: Michael C. Bertram, San Jose, CA (US)

(73) Assignee: Cox Communications, Inc., Atlanta, GA (US)

( * ) Notice: Subject to any disclaimer, the term of this patent is extended or adjusted under 35 U.S.C. 154(b) by 1333 days.

(21) Appl. No.: 10/359,106

(22) Filed: Feb. 5, 2003

(65) Prior Publication Data

US 2003/0140340 A1 Jul. 24, 2003

Related U.S. Application Data

(63) Continuation of application No. 09/458,620, filed on Dec. 10, 1999, now abandoned.

(60) Provisional application No. 60/127,122, filed on Mar. 31, 1999, provisional application No. 60/127,128, filed on Mar. 31, 1999.

(51) Int. Cl.
*H04N 7/167* (2011.01)
*H04N 7/16* (2011.01)
*G06F 7/04* (2006.01)

(52) U.S. Cl. .......... 725/31; 380/200; 380/201; 380/202; 380/203; 726/26; 726/27; 726/30; 725/25

(58) Field of Classification Search ............ 725/25, 725/46, 87, 44, 31
See application file for complete search history.

(56) References Cited

U.S. PATENT DOCUMENTS

| 4,864,614 | A | | 9/1989 | Crowther ............ 380/20 |
|---|---|---|---|---|
| 4,890,319 | A | | 12/1989 | Seth-Smith et al. .......... 380/202 |
| 4,890,321 | A | * | 12/1989 | Seth-Smith et al. .......... 380/231 |
| 4,975,951 | A | | 12/1990 | Bennett ............ 380/20 |
| 5,557,346 | A | | 9/1996 | Lipner et al. ............ 380/286 |
| 5,627,892 | A | * | 5/1997 | Kauffman ............ 380/212 |
| 5,649,283 | A | | 7/1997 | Galler et al. ............ 725/87 |
| 5,680,457 | A | | 10/1997 | Bestler et al. ............ 380/239 |
| 5,742,677 | A | | 4/1998 | Pinder et al. ............ 380/242 |
| 5,797,010 | A | | 8/1998 | Brown ............ 717/11 |
| 5,835,843 | A | | 11/1998 | Haddad ............ 725/115 |
| 5,856,973 | A | | 1/1999 | Thompson ............ 370/389 |
| 5,999,629 | A | | 12/1999 | Heer et al. ............ 705/51 |
| 6,157,719 | A | * | 12/2000 | Wasilewski et al. ......... 380/210 |
| 6,182,129 | B1 | | 1/2001 | Rowe et al. ............ 709/221 |
| 6,229,895 | B1 | * | 5/2001 | Son et al. ............ 380/200 |
| 6,256,393 | B1 | * | 7/2001 | Safadi et al. ............ 380/232 |
| 6,378,130 | B1 | * | 4/2002 | Adams ............ 725/95 |
| 2005/0259813 | A1 | * | 11/2005 | Wasilewski et al. ............ 380/28 |

* cited by examiner

*Primary Examiner* — Kieu Oanh Bui
*Assistant Examiner* — Jean D Saint Cyr
(74) *Attorney, Agent, or Firm* — Merchant & Gould

(57) ABSTRACT

A conditional access control apparatus for inserting descrambling messages and impulse authorizations to enable requesting subscribers to utilize requested scrambled content. The apparatus includes a content and asset storage module for storing content and assets, and a pre-encryption module for encrypting content to be stored in said content device. A transport processor inserts stored content into a forward application transport channel (FATC), and a controller interacts with a requesting subscriber and inserts into the FATC descrambling messages and impulse authorizations enabling the requesting subscriber to utilize requested scrambled content.

12 Claims, 6 Drawing Sheets

METHOD AND APPARATUS FOR PERFORMING IMPULSE AUTHORIZATIONS WITHIN A VIDEO ON DEMAND ENVIRONMENT

CROSS REFERENCE TO RELATED APPLICATIONS

This application is a continuation of commonly owned, U.S. patent application Ser. No. 09/458,620, filed on Dec. 10, 1999, now abandoned and claims benefit of U.S. Provisional Patent Application Ser. Nos. 60/127,128 and 60/127,122, both filed on Mar. 31, 1999, and such related applications are incorporated herein by reference in their entireties.

BACKGROUND OF THE INVENTION

1. Field of the Invention

The present invention relates to an information distribution system such as a video-on-demand (VOD) system. More particularly, the present invention relates to a method and apparatus for applying conditional access impulse authorization techniques to information on demand services such as video on demand services.

2. Description of the Background Art

In an information distribution system, such as video on demand (VOD) system, an information provider (e.g., a head-end in a cable television system) must control of the distribution of requested information to ensure that only an appropriate information consumer (e.g., a requesting VOD subscriber) is able to utilize the distributed information. To provide this functionality, information distribution systems are often implemented using a conditional access system.

VOD systems providing content encoded according to the various Moving Pictures Experts Group (MPEG) standards are known. For example, a first standard known as MPEG-1 refers to ISO/IEC standards 11172, which is incorporated herein by reference in its entirety. A second standard known as MPEG-2 refers to ISO/IEC standards 13818, which is incorporated herein by reference in its entirety. Additionally, a compressed digital video system is described in the Advanced Television Systems Committee (ATSC) digital television standard document A/53, incorporated herein by reference.

MPEG-based conditional access systems typically have three main attributes: the scrambling (or encoding) of MPEG streams, the transmission of de-scrambling messages and the transmission of authorization messages. De-scrambling messages are embedded in the MPEG transport stream and used by information consumer equipment (e.g., set top terminals) to descramble the content. Authorization messages can be sent with the scrambled stream or by some other route and are used to authorize set top terminals to use the descrambling information.

Most conditional access systems support addressing authorization messages to a pre-defined individual set top terminal (STT) or groups of STTs. That is, the head end controls which set top terminals receive the authorization messages. This method is primarily used to support conditional access for premium services (such as HBO) and call ahead pay per view.

Some conditional access systems support the concept of impulse authorizations. Impulse authorizations are primarily used for pay per view events. In the impulse method of authorization, non-STT specific authorization messages are sent to all set top terminals. The set top terminal determines if the authorization message is to be used (based upon input to the STT indicative of the desires of a viewer). Thus, the head-end of such a VOD system does not know which STTs will use the authorization. Each STT using the authorization must report such use to the head-end in some manner to ensure proper billing for content that has already been presented to the viewer.

Existing conditional access systems use a schedule including a start time, an end time, channel location, and an event number to control the scrambling, transmission of descrambling messages, and transmission of impulse authorization messages identified by the event number. In parallel, set top terminals are provided with a list of pay per view events as, e.g., a menu or electronic programming guide. Each of those pay per view events has an associated event number matching the number provided to the conditional access system. When a viewer orders a pay per view event, the set top box uses the associated event number to find the appropriate impulse authorization.

Video on demand does not fit this model because the start time, the end time, and the channel location of events are typically not known in advance.

Therefore, it is seen to be desirable to provide a method and apparatus enabling conditional access to on-demand content of variable duration. Moreover, it is seen to be desirable to provide such conditional access using impulse authorizations. More generally, it is seen to be desirable to apply such impulse authorization techniques to content such that requested content may be real-time encrypted or pre-encrypted.

SUMMARY OF THE INVENTION

The disadvantages heretofore associated with the prior art are overcome by the present invention of a conditional access control apparatus for inserting descrambling messages and impulse authorizations to enable requesting subscribers to utilize requested scrambled content. The apparatus includes a content and asset storage module for storing content and assets, and a pre-encryption module for encrypting content to be stored in said content device. A transport processor inserts stored content into a forward application transport channel (FATC), and a controller interacts with a requesting subscriber and inserts into the FATC descrambling messages and impulse authorizations enabling the requesting subscriber to utilize requested scrambled content.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Throughout this description various terms are used to describe the invention. Unless modified by the following description, several of the terms are defined as follows: Scrambling comprises a method of protecting a data stream by transforming the value of bits in the stream based on a given key. For the purposes of this disclosure scrambling has the same meaning as encrypting. Descrambling comprises a method for transforming data stream bits back to their original value based on the use of a key. For the purposes of this description disclosure has the same meaning as decryption. A conditional access (CA) system is a system that generates keys, descrambling messages, and impulse authorization messages supporting the scrambling and descrambling of, e.g., MPEG encoded programs. A descrambling message comprises a conditional access message containing descrambling information for a particular MPEG program. The descrambling information may be the descrambling key or the information a Set Top Box (or boxes) needs to generate the descrambling key. An impulse authorization message comprises a conditional access message authorizing Set Top Boxes to use a descrambling key to descramble a particular MPEG program.

Figure 1:
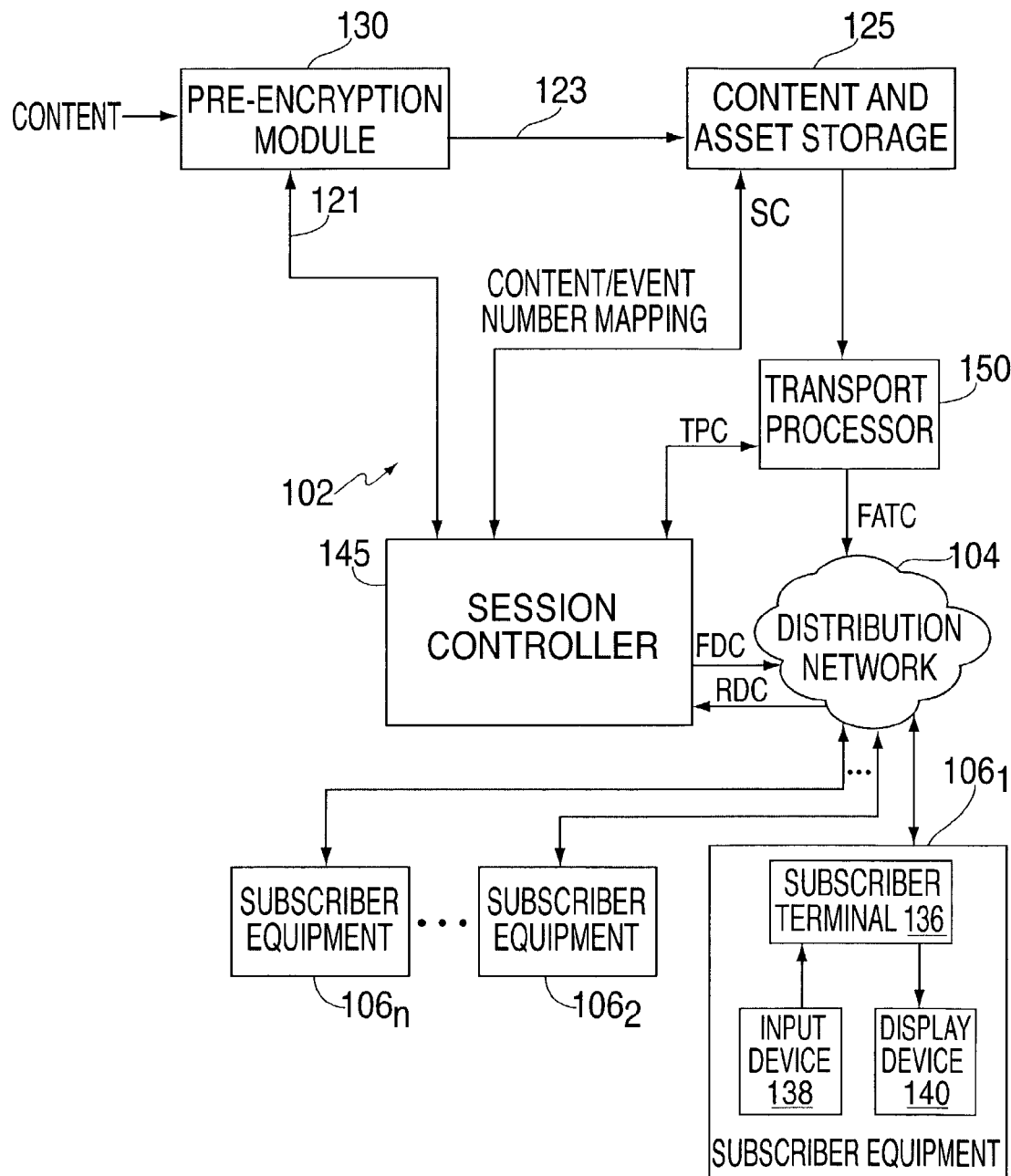
FIG. 1 depicts a high level block diagram of an interactive information distribution system.

FIG. 1 depicts a high level block diagram of an interactive information distribution system. Specifically, FIG. 1 depicts a high level block diagram of an interactive information distribution system 100 containing the present invention and suitable for applying impulse authorization techniques using pre-encrypted content. The system 100 contains service provider equipment 102, a communications network 104 and subscriber equipment 106$_n$, where n is an integer greater than zero.

The service provider equipment 102 comprises a content and asset storage module 125, a pre-encryption module 130, a session controller 145 and a transport processor 150. Briefly, the session controller 145, in response to a request from subscriber equipment 106, causes requested content and associated assets to be retrieved from the content and asset storage module 125 and provided to the transport processor 150. The transport processor 150 combines or multiplexes the content and asset data to provide an output data stream for the requesting subscriber. The output data stream is conditioned for transport to the requested subscriber via a forward application transport channel (FATC) within the distribution network 104.

The content and asset storage module 125 is used to store content such as movies, television programs and other information offerings of the interactive information distribution system 100 of FIG. 1. Additionally, the content and asset storage module 125 is used to store assets such as bit map imagery, graphic overlay, control scripts and the like. The assets may comprise, for example, navigation assets that are used by a set top terminal to interactively navigate, and select for viewing, the offerings or content available from the service provider equipment 102. The content and asset storage module 125, in response to a control signal SC produced by the session controller 145, provides content and/or asset data to the transport processor 150.

The session controller 145 (or session controller) provides session control of the information flowing to and from the content and asset storage module 125, and may be generally described as a system providing or controlling communications between, for example, a cable system head-end and one or more set top terminals. The session controller 145 produces the storage control signal SC for controlling and communicating with the content and asset storage module 125, and a transport processor control signal TPC for controlling and communicating with the transport processor 150. In response to a user request for particular content, the session controller 145 causes the requested content file and any associated assets to be streamed from the content and asset storage module 125 to the transport processor 150.

The session controller 145 sends data, such as commands to set top terminals via a forward data channel (FDC). The session controller 145 receives data, such as information stream requests and session initiation data (set top identification, capability and the like) via a reverse data channel (RDC). The FDC and RDC are supported by the distribution network 104 and comprise relatively low bandwidth data channels, such as one-two megabits per second data channels utilizing QPSK, QAM, or other modulation techniques. The FDC and RDC are also known as "out-of-band" channels, while the relatively high bandwidth forward application transport channel (FATC) is also known as an "in-band" channel. The session controller 145 contains an interface device for sending control information via the forward data channel FDC and receiving control information and request information via the reverse data channel RDC using the so-called "out-of-band" carrier frequencies.

The transport processor 150 accomplishes all of the forward content channel transmission interface requirements of the system 100 of FIG. 1. Specifically, the transport processor 150 is coupled to subscriber equipment via the forward applications transport channel (FATC). That is, the transport processor 150 is capable of providing a plurality of scrambled or unscrambled content and/or asset streams modulated onto various carrier frequencies suitable for use in the distribution network 104. The FATC is supported by the distribution network 104 and comprises a relatively high bandwidth communications channel well suited to carrying video, audio and data such as, for example, multiplexed MPEG-2 transport packets. It should be noted that data normally conveyed to a set top terminal via the FDC may be included in the FATC data stream. The transport processor 150 also contains a modulator for modulating the combined content and asset stream onto one or more carrier frequencies for transmission on the FATC, the so-called "in-band" carrier frequencies.

The pre-encryption module 130 receives content, associates the content with an event number, encrypts the content from a content development facility (not shown), and embeds descrambling messages and impulse authorization messages into the encrypted content stream to form a so-called "pre-encrypted" content stream. The pre-encrypted content stream is stored in the content and asset storage module 125, from which it can be retrieved for subsequent transport to a STT in response to a request from the STT (e.g., a video on demand request). The pre-encryption module 130 provides, via signal path 121, the session controller 145 with an event identification that associates the encrypted content with the impulse authorization. The operation of the pre-encryption module 150 will be discussed in more detail below with respect to FIGS. 3 and 4.

The distribution network 104 can be any one of a number of conventional broadband communications networks that are available such as a fiber optic network, a telephone network, existing cable television network and the like. For example, if the network is a hybrid fiber-coax network, the transmission transport technique used in both forward channels may be modeled after the Moving Pictures Expert Group (MPEG) transport protocol for the transmission of video data streams. In general, the transport mechanism for both of the forward channels that transport information to the set top terminal must be able to carry unidirectional, asynchronous packetized data such as that defined in the MPEG video and audio signal transmission protocol, and the like. There are a number of such transport protocols available.

The subscriber equipment 106 comprises a set top terminal or a set top box 136, a display device 140 (e.g. a conventional television) and a user input device 138 (e.g. a remote control device). Each set top terminal 136 receives the data streams from the FATC, demodulates the received data streams and, in the case of video streams, processes the demodulated video streams for subsequent display on the display device 140. In the case of receiving scrambled data streams, the STT descrambles the received data streams using the descrambling messages DM provided to the STT via the FATC. The STT uses the impulse authorization messages IAM provided via the FATC to gain the authorization needed to use the descrambling messages. In addition, the set top terminal 136 accepts commands from the remote control input device 138 or other input device. These commands are formatted, modulated, and transmitted through the distribution network 104 to the session controller 145. Typically, this transmission is accomplished through the reverse data channel RDC. These commands are preferably transmitted through the same network used to transmit information to the set top terminal. However, the RDC coupling the set top terminal to the provider equipment 102 may be a separate network, e.g. a FATC through a television cable network and an RDC through a telephone network. The telephone network could also support the FDC.

Figure 2:
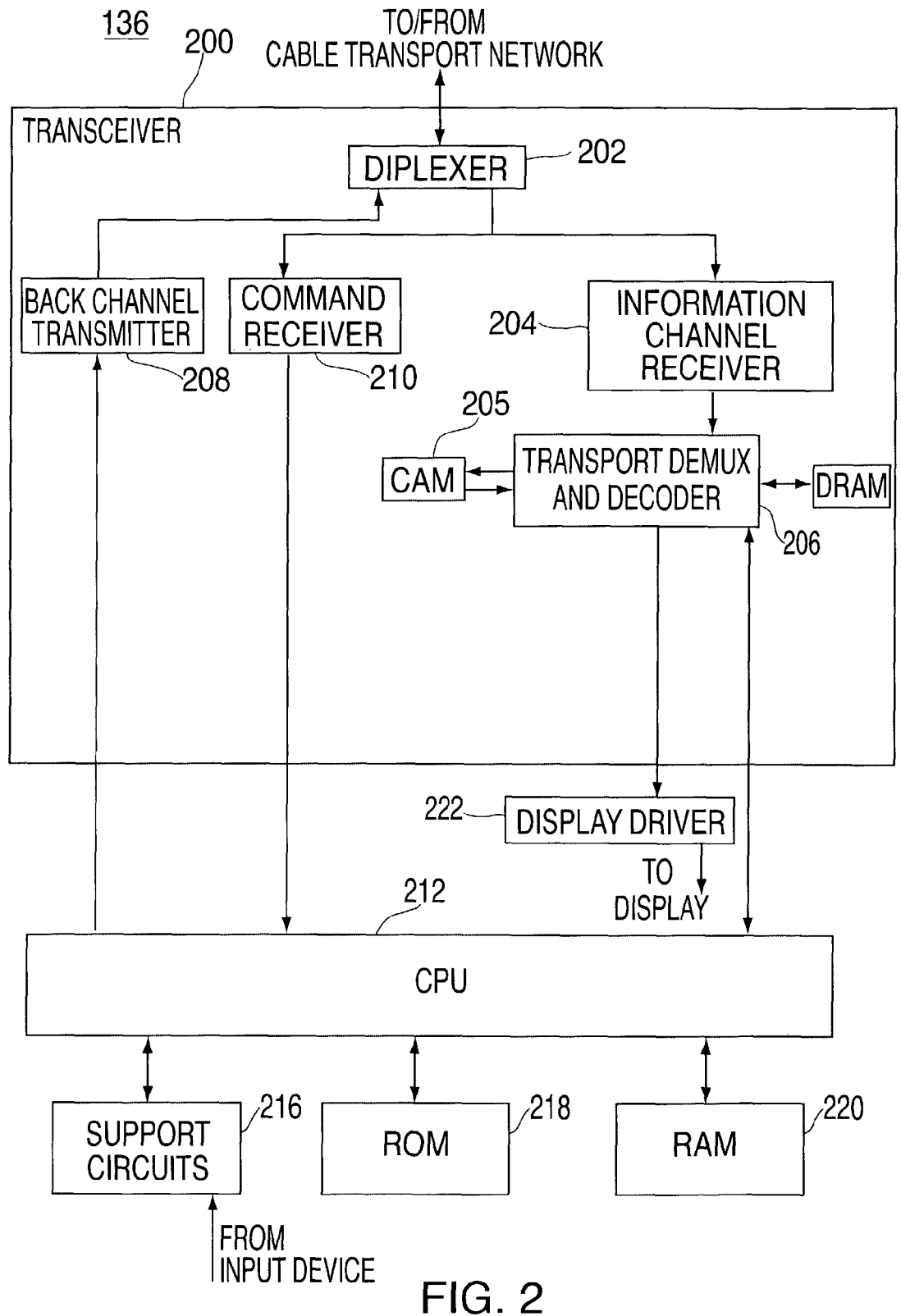
FIG. 2 depicts a block diagram of the set top terminal suitable for use in the interactive information distribution system of FIG. 1.

FIG. 2 depicts a block diagram of the set top terminal (STT) suitable for use in the interactive information distribution system of FIG. 1. A set top terminal (or set top box) comprises a device capable of receiving and decompressing content within, e.g., an MPEG transport stream to produce a resulting signal(s) suitable for use by a presentation device such as a display device. Set top terminals are also capable of conditional access message processing and transport stream descrambling.

Specifically, FIG. 2 depicts a block diagram of an exemplary embodiment of the set top terminal 136 interactive information distribution system of FIG. 1. The STT 136 of FIG. 2 comprises a transceiver 200, a central processing unit (CPU) 212 and a display driver 222. The CPU 212 is supported by random access memory (RAM) 220, read only memory (ROM) 218 and various support circuits 216 such as clocks, power supply, an infrared receiver and the like. The transceiver 200 contains a diplexer 202, a back channel transmitter 208, an information channel receiver 204, a conditional access module 205, a command channel receiver 210 and an transport demultiplexer and decoder 206. The diplexer 202 couples the three channels carried by a single cable within the network to the transmitter and receivers.

Each receiver 204 and 210 contains a tuner, amplifiers, filters, a demodulator, and a depacketizer. As such, the receivers tune, downconvert, and depacketize the signals from the cable network in a conventional manner. The information channel receiver 204 contains a conventional QAM demodulator such as a model BCM3115 manufactured by the Broadcom Corporation. Other such demodulators are well-known in the communications arts and could be used in this application. However, this particular QAM demodulator also contains a built in "out-of-band" QPSK demodulator for handling data carried by the forward data channel FDC. As such, a single integrated circuit demodulates both subscriber requested information (audio and video) as well as command data.

The transport demultiplexer and decoder 206 processes the data packets carrying subscriber requested information produced by the QAM demodulator into useable signals for the end user display, e.g., television, home studio, video recorder and the like. The decoder is coupled to a dynamic random access memory (DRAM) to facilitate decoding of the data packets and processing of applets, as shall be discussed below. The signals for display are conventionally processed by a display driver 222 to produce a video signal suitable for use by, e.g., the display device 140.

The transport demultiplexer and decoder 206 also extracts authorizations and descrambling messages from the received data stream and provides the extracted authorizations and descrambling messages to the conditional access module 205.

The conditional access module 205, illustratively a smart card, accepts authorizations and descrambling messages extracted by the transport demultiplexer and decoder 206 and responsively provides descrambling keys for the selected content stream.

The transport demultiplexer and decoder 206 utilizes the descrambling keys provided by the conditional access module 205 to descramble or decrypt the selected content stream prior to decoding the stream to form appropriate presentation signals.

The demodulated QPSK signal provides command and control information to the CPU 212 for generating a graphical user interface upon the display device 140. The CPU 212, operating in combination with the transport demultiplexer and decoder 206, as well as a continuously available video signal from the information receiver 204, produces screen displayed buttons, icons and graphical regions with which a subscriber interacts using the remote control 138. User interaction comprises, e.g., the navigation of a graphical user interface to select one of a plurality of available program titles for immediate or future presentation.

Referring to FIG. 1, session control commands are implemented by the session controller 145 and not the set top terminal 136 alone. Each command is implemented by the execution of an applet by the set top terminal 136. The applet is transmitted to the STT by the session controller 145 in response to, for example, requests transmitted by the STT via the RDC. The applets control both information sessions, for example, the presentation of video to the television screen, and navigator functions, for example, the menus that facilitate selection of a video program. As such, particular commands include, but are not limited to, information or menu navigation commands, movie start at beginning, movie start at the middle, play, stop, rewind, forward, pause, and the like. These presentation and navigation control commands are sent via a back channel transmitter 208 using binary phase shift key (BPSK) modulation.

As previously noted, the pre-encryption module 130 receives the content, associates the content with an event number, encrypts the content, and embeds descrambling messages and impulse authorization messages into the encrypted content stream to form a so-called "pre-encrypted" content stream. The pre-encrypted content stream is stored in the content and asset storage module 125, from which it can be retrieved for subsequent use by the session controller 145 in response to a request from a set top terminal (e.g., a video on demand request).

The session controller 145 controls the output of the content and asset storage module 125 via the control signal SC. The session controller 145 receives information from the pre-encryption module 130, such as content and event number mapping information, via signal path 121. The session controller 145 receives session control messages, content requests and other information from the subscriber equipment 106 via the RDC. The session controller 145 transmits session control messages, event numbers and other information to the subscriber equipment 106 via the FDC or, optionally, the FATC. The pre-encryption module 130 couples pre-encrypted content to the content and asset storage module 125 via signal path 123. The transport processor 150 processes content and/or asset data and modulates the processed data onto a carrier frequency associated with a physical channel intended to be tuned by a STT 106 requesting the content and/or asset data.

Figure 3:
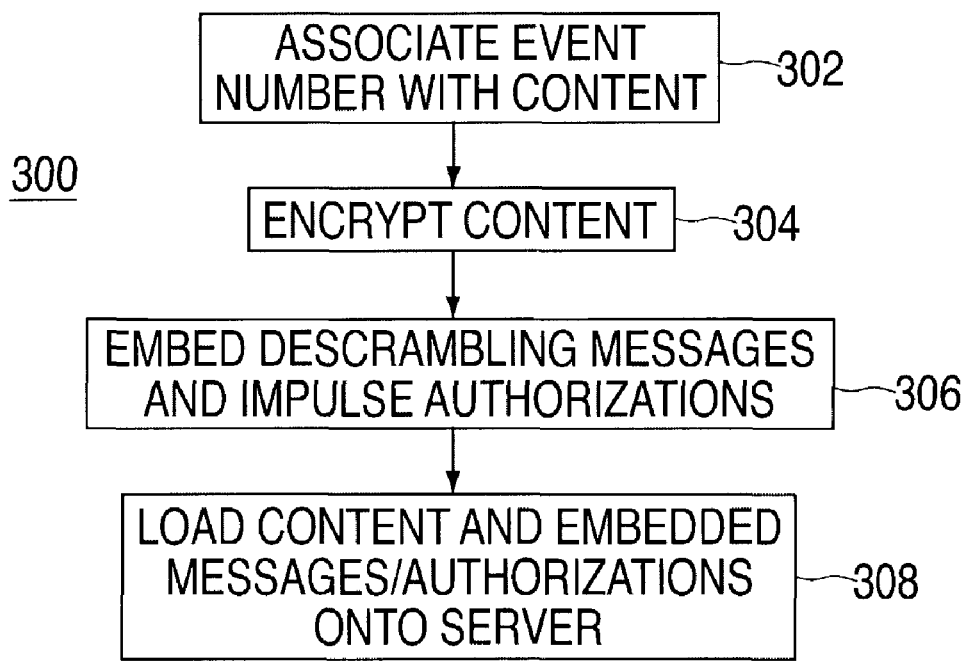
FIG. 3 depicts a flow diagram of a content processing method suitable for use in the system of FIG. 1.

FIG. 3 depicts a flow diagram of a content processing method suitable for use in the system of FIG. 1. Specifically, FIG. 3 depicts a method 300 suitable for use by the pre-encryption module 130 of the interactive information distribution system 100 of FIG. 1.

The method 300 of FIG. 3 is entered at step 302 where an event number is associated with received content. That is, an information stream (e.g., a digital video stream and a related audio stream) providing content such as a movie, television show, sporting event or other audio visual or informational presentation is received by the pre-encryption module 130 and associated with an event number. The event number is an alpha-numeric or other identifier for uniquely identifying a particular event. The event number associated with the received content is also communicated to the session controller 145 for subsequent session processing between the session controller 145 and subscriber equipment 106.

At step 304 the content stream is encrypted. That is, the content is scrambled or encrypted according to a scrambling or encrypting algorithm to produce a scrambled or encrypted content stream.

At step 306 descrambling messages and impulse authorizations are embedded into the encrypted content stream. The descrambling messages comprise a conditional access message containing the descrambling information for a particular content stream, such as an MPEG program. The descrambling information may be the descrambling key or the information a set top terminal or subscriber equipment needs to generate the descrambling key.

The impulse authorization is a conditional access message usable by any set top terminal to allow that set top terminal to use a descrambling key to descramble a particular content stream, such as an MPEG program. Thus, the encrypted content stream includes a descrambling key (or information necessary to generate such a descrambling key) and an authorization to use the descrambling key. It is critical to note that the descrambling messages and impulse authorizations are embedded in the encrypted content such that any streaming of that content to a subscriber inherently includes the providing of the descrambling messages and impulse authorizations to that subscriber.

At step 308 the encrypted content including the embedded descrambling messages and impulse authorizations is loaded onto a server or other data storage device, such as the content and asset storage module 125 of the system 100 of FIG. 1.

Figure 4:
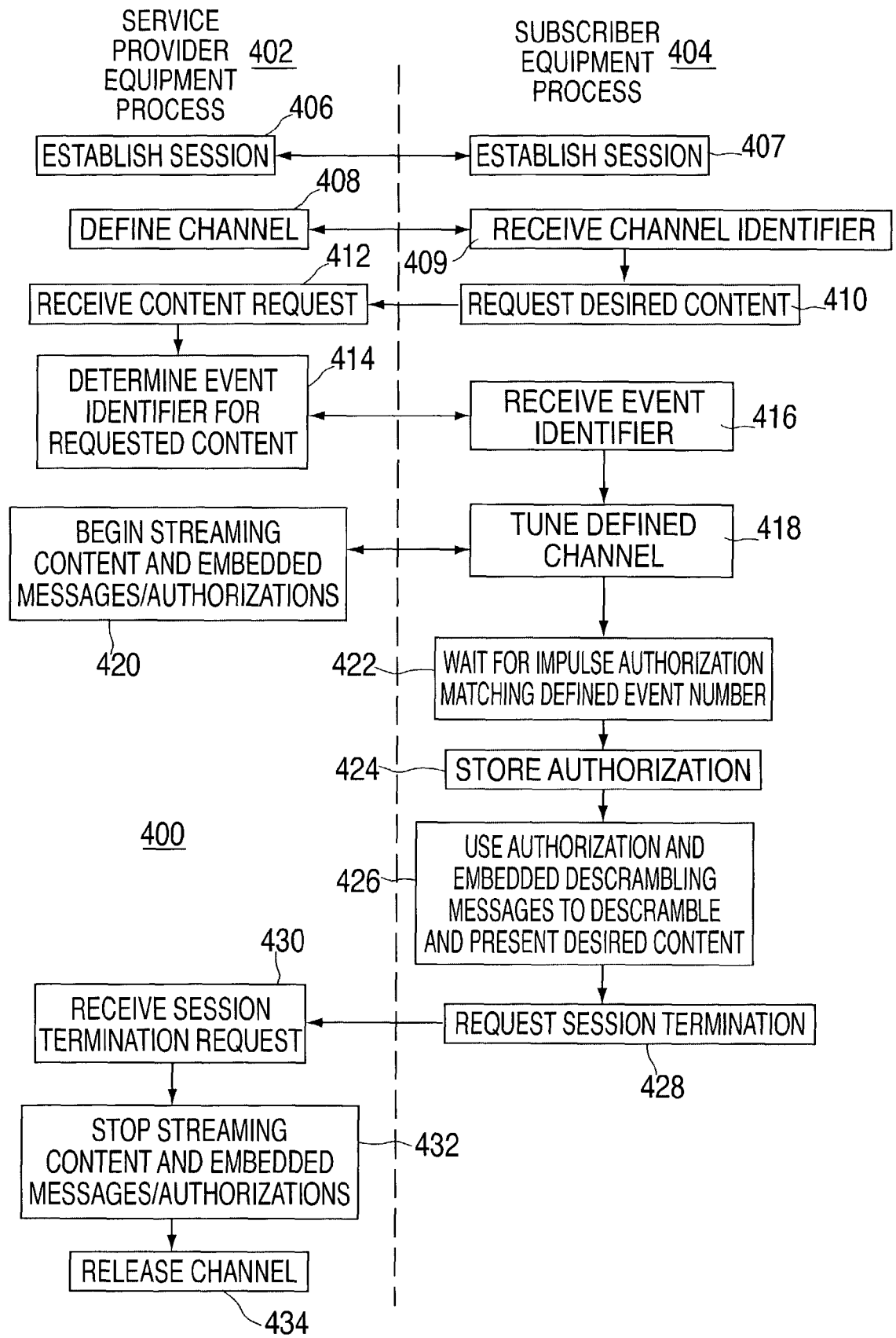
FIG. 4 depicts a flow diagram of an illustrative implementation of an impulse authorization method as performed on both service provider equipment and subscriber equipment within the interactive information distribution system of FIG. 1.

FIG. 4 depicts a flow diagram of an illustrative implementation of an impulse authorization method as performed on both the service provider equipment and subscriber equipment. Specifically, FIG. 4 is divided into two columns, namely: a service provider equipment process column 402 and a subscriber equipment process column 404.

In the above manner, content is scrambled and the impulse authorization messages are embedded once, before the content is loaded onto the content and asset storage module 125. It should be noted that these functions may also be performed during, e.g., transmission of the content to one or more set top terminals.

The method 400 of FIG. 4 begins at steps 406 and 407 where, respectively, the service providers equipment and subscriber equipment establish a session with each other.

At step 408 the service provider equipment identifies or defines a channel identifier (e.g., a physical and logical transmission channel) and communicates the defined channel identifier to the subscriber equipment. The subscriber equipment receives the defined channel identifier at step 409.

At step 410 the subscriber equipment requests desired content from the service provider equipment. At step 412 the service provider equipment receives the content request from the subscriber equipment.

At step 414 the service provider equipment determines the event identifier (e.g., an event number) for the requested content and communicates the event number to the subscriber equipment. At step 416 the subscriber equipment receives the event number for the requested content from the service provider equipment.

At step 418 the subscriber equipment tunes the defined channel, illustratively, a QAM channel comprising one or more transport streams including video and audio streams associated with the requested content. At step 420 the service provider equipment begins streaming the requested content and the embedded messages and authorizations to the subscriber equipment via the defined channel.

At step 418 the subscriber equipment tunes the defined channel and begins to extract the streamed content and embedded messages and authorizations provided by that channel.

At step 422 the subscriber equipment waits for an impulse authorization matching the defined event number. That is, the set top box, having tuned to the channel indicated during the session setup, monitors the incoming data looking for an impulse authorization matching the event number provided by the session controller 145. When the set top box sees an impulse authorization matching the event number, it stores that authorization for use. The set top box will then use that impulse authorization, along with the embedded descrambling messages for that channel, to descramble and present the content to the viewer.

At step 424, upon receiving an impulse authorization matching the defined event number (per step 422), the impulse authorization is stored within the subscriber equipment memory. At step 426 the stored impulse authorization is used along with the embedded descrambling messages within the streamed content to descramble and present the desired content. That is, at step 426 the subscriber equipment utilizes the embedded impulse authorization and descrambling messages within the streaming content to descramble that content and present the descrambled content on, e.g., a display device.

At step 428, upon concluding the presentation of the desired content, the subscriber equipment requests that the session be terminated. At step 430 the service provider equipment receives a session termination request from the subscriber equipment. At step 432 the service provider equipment stops streaming the requested content and embedded messages and impulse authorizations. At step 434 the service provider equipment releases the defined channel such that the channel may be utilized by another session between the service provider equipment and another subscriber.

In the above described embodiment of the invention, it is noted that prior to the storing of any content in the content and asset storage module 125, the content is scrambled and descrambled messages and impulse authorizations are embedded in the resulting stream to form a pre-encrypted information stream. The scrambling and conditional access messages are based on a specified event number that is associated with the content by the pre-encryption module 130 and provided to the session controller 145. The scrambled content is then loaded onto the content and asset storage module 125 and made available for viewing by subscriber equipment 106.

The above-described methods and apparatus provide a non-standard use of impulse authorizations in which impulse authorizations are embedded within pre-encrypted content. As noted above, the pre-encrypted content is content that has been scrambled (encrypted) before storage on the server and includes descrambling messages and impulse authorizations needed by set top terminals to descramble the content.

Since the impulse authorizations are already embedded in the pre-encrypted content stream, the problems associated with regular (i.e., STT/STB-specific or non-impulse) authorizations are avoided. That is, the embedding of specific impulse authorizations during pre-encryption is not desirable (or possible) because it is not known in advance which set top terminals will be requesting specific pieces of content.

Additionally, since the content scrambling and insertion of conditional access messages occurs off-line (i.e., prior to streaming the content to a requesting subscriber), problems associated with unscheduled variable length events are bypassed. Using a definition whereby an event is defined both by the time the content starts and stops being scrambled and by the period of time where descrambling and authorization messages are valid and distributed, a pre-encrypted event exists any time that the server is streaming the content. Moreover, because the content has been pre-encrypted, it is always scrambled and the messages are always sent any time the server is streaming that piece of content.

Figure 5:
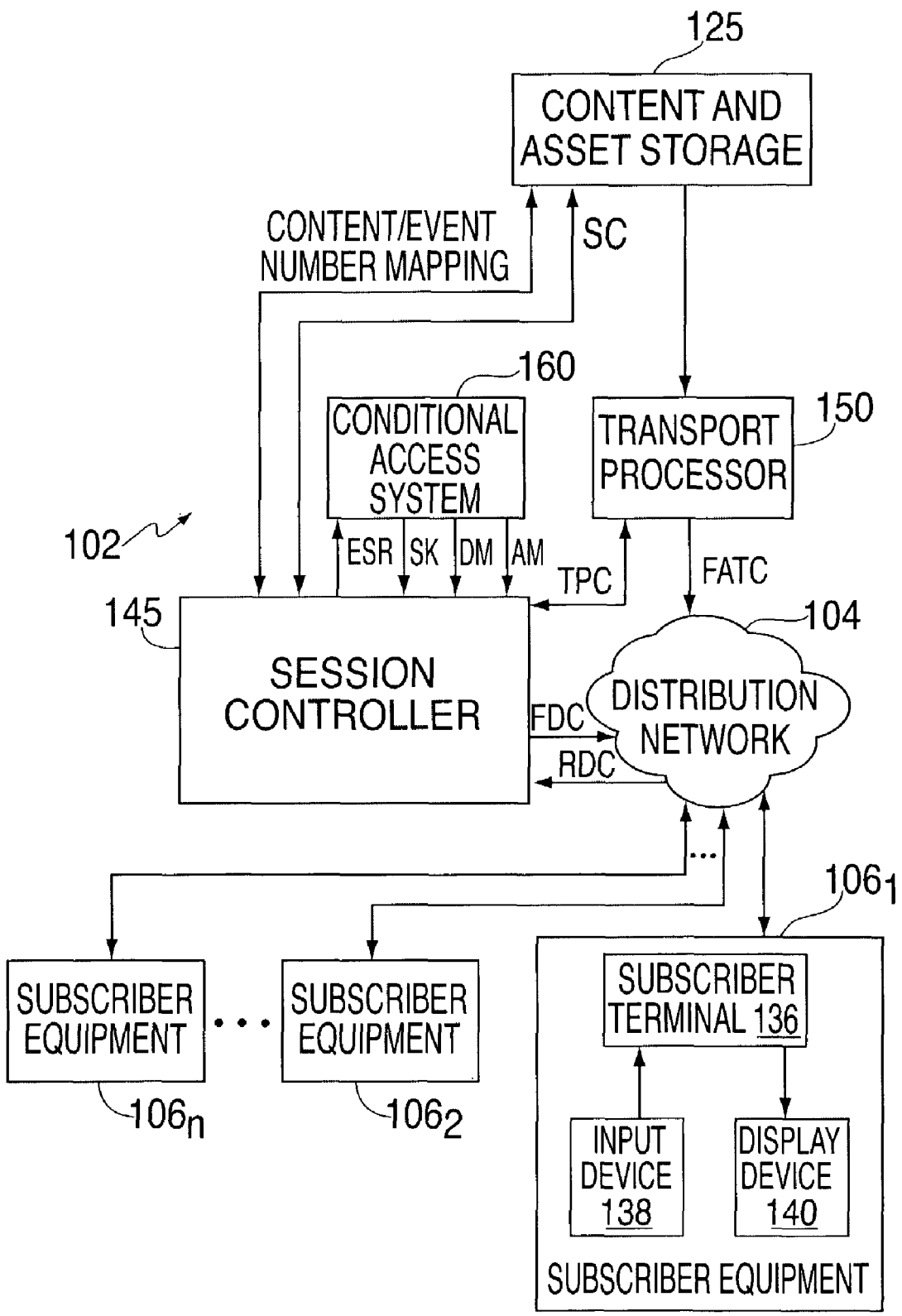
FIG. 5 depicts a high level block diagram of an alternate embodiment of the interactive information distribution system of FIG. 1.

FIG. 5 depicts a high level block diagram of an alternate embodiment of the interactive information distribution system of FIG. 1. Specifically, FIG. 5 depicts a high level block diagram of an interactive information distribution system 500 containing an embodiment of the present invention and suitable for applying impulse authorization techniques using real-time encrypted content. Since the interactive information distribution system 500 of FIG. 5 is similar in many respects to the interactive information distribution system 100 of FIG. 1, only the differences between the two systems will be discussed in detail. These differences are primarily within the service provider equipment 102 of the system. The primary functional difference between the two systems is the use of off-line encryption (i.e., pre-encryption) by the system 100 of FIG. 1, and the use of real-time encryption (i.e., while streaming content to a requesting STT) by the system 500 of FIG. 5.

Specifically, the service provider equipment 102 of the system 500 of FIG. 5 does not include the pre-encryption module 130 found in the system 100 of FIG. 1. However, unlike the service provider equipment 102 of the system 100 of FIG. 1, the service provider equipment 102 of the system 500 of FIG. 5 includes a conditional access system 160. This and other differences will now be discussed in detail.

Referring to FIG. 5, the conditional access system 160, in response to an event request scrambling (ESR) signal produced by the session controller 145, generates scrambling keys SK, descrambling messages DM and authorization messages AM which are provided to the transport processor 150.

The transport processor 150 is capable of scrambling content and of inserting descrambling messages and impulse authorization messages IAM into a transport stream being provided to an output channel. The transport processor 150 utilizes the scrambling keys SK provided by the conditional access system 160 to scramble specific content, or content on a specific channel. The transport processor 150 embeds the descrambling messages DM and impulse authorization messages IAM provided by the conditional access system 160 (via the session controller 145) within the scrambled content or channel (that is, in-band communications to a requesting STT).

The transport processor 150 scrambles the retrieved content provided by the content and asset storage module 125 and inserts descrambling messages and impulse authorization messages (IAM) into a transport stream including the scrambled content.

In a scrambling mode of operation, the session controller 145 provides the event scramble request (ESR) signal to the conditional access system 160 including the channel number or identifier of the channel to be scrambled (this channel identifier is also provided to the STT requesting the scrambled content stream). The event scramble request ESR signal also includes information indicative of the content and/or asset data to be scrambled, and which channel is to transport the scrambled content and/or asset data to the requesting STT.

Figure 6:
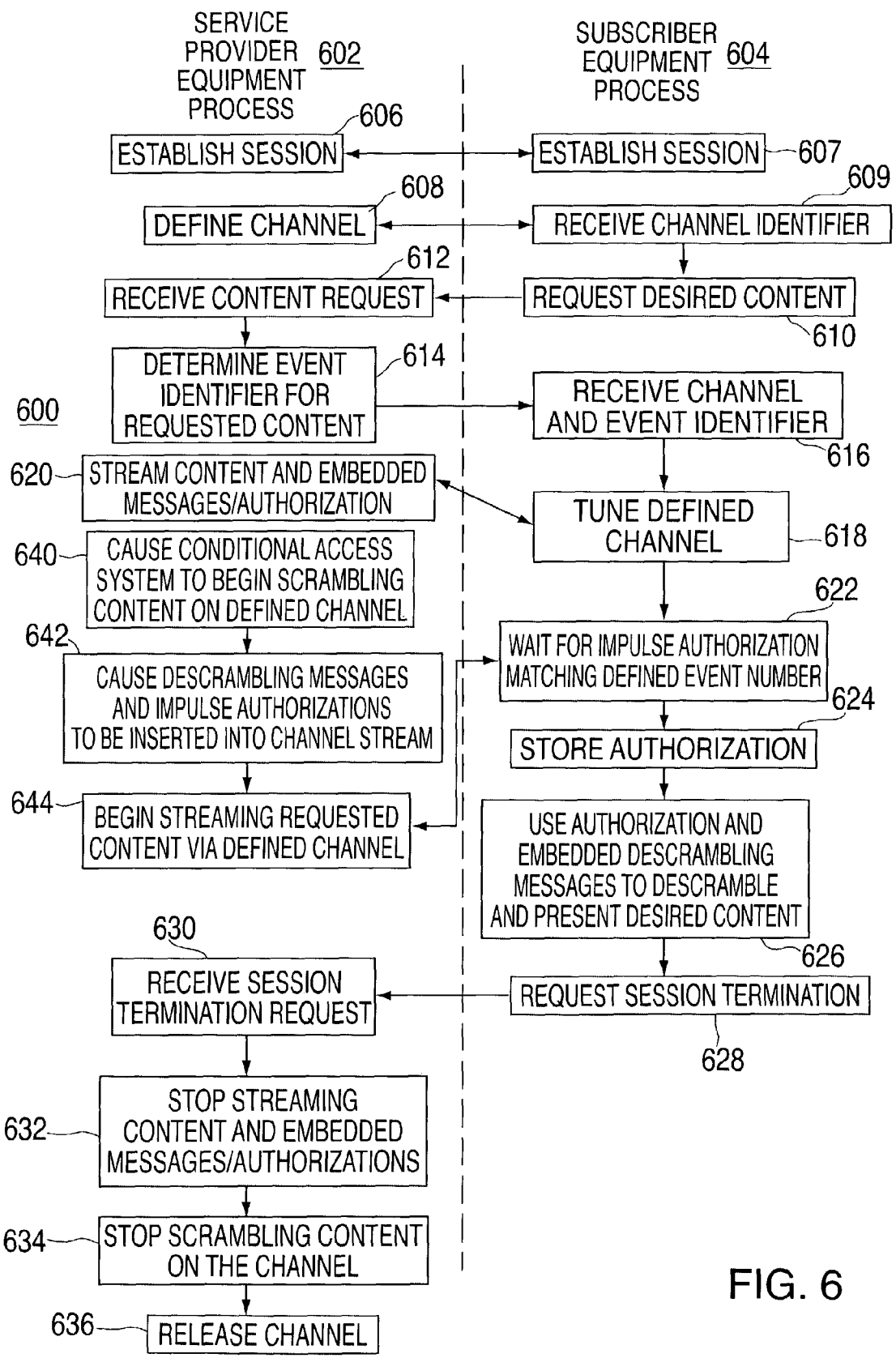
FIG. 6 depicts a flow diagram of an illustrative implementation of an impulse authorization method as performed on both service provider equipment and subscriber equipment within the interactive information distribution system of FIG. 5.

FIG. 6 depicts a flow diagram of an illustrative implementation of a second embodiment of an impulse authorization method as performed on both the service provider equipment 102 and subscriber equipment 106 of FIG. 5. Specifically, FIG. 6 is divided into two columns, namely: a service provider equipment process column 602 and a subscriber equipment process column 604.

The method 600 of FIG. 6 begins at steps 606 and 607 where, respectively, the service providers equipment 102 and subscriber equipment 106 establish a session with each other.

At step 608 the service provider equipment 102 identifies or defines a channel identifier (e.g., a physical and logical transmission channel) and communicates the defined channel identifier to the subscriber equipment. The subscriber equipment receives the defined channel identifier at step 609.

At step 610 the subscriber equipment 100 requests desired content from the service provider equipment. At step 612 the service provider equipment receives the content request from the subscriber equipment.

At step 614 the service provider equipment determines the event identifier. The defined channel and event number is communicated to the subscriber equipment. At step 616 the subscriber equipment receives the channel and event number for the requested content from the service provider equipment. At step 618 the subscriber equipment tunes the defined channel, illustratively, a QAM channel received via the FATC comprising a transport stream including video and audio streams associated with the requested content. At step 620 the service provider equipment begins streaming the requested content and the embedded messages and authorizations to the subscriber equipment via the defined channel.

At step 618 the subscriber equipment tunes the defined channel and begins to extract the streamed content and embedded messages and authorizations provided by that channel.

At step 622 the subscriber equipment waits for an impulse authorization matching the defined event number. That is, the set top box, having tuned to the channel indicated during the session setup, monitors the incoming data looking for an impulse authorization matching the event number provided by the session controller. When the set top box sees an impulse authorization matching the event number, it stores that authorization for use. The set top box will then use that authorization, along with the embedded descrambling messages for that channel, to descramble and present the content to the viewer.

At step 640 the provider equipment causes the conditional access system to begin generating messages and authorizations and the transport processor 150 to begin scrambling the information stream provided to the subscriber equipment via the defined channel. That is, the transport processor 150 scrambles the content to be provided to the channel intended to be used by a STT requesting scrambled content.

At step 642, the provider equipment causes the descrambling messages and impulse authorization messages (IAM) to be inserted into the transport stream provided to the defined channel. That is, the transport processor 150 inserts descrambling messages and impulse authorization messages (IAM) into the transport stream provided to the channel intended to be used by a STT requesting scrambled content.

At step 644, the provider equipment begins streaming the transport stream comprising the scrambled content and inserted (i.e., multiplexed) descrambling messages and impulse authorizations to the STT via the defined channel.

At step 624, upon receiving an impulse authorization matching the defined event number (per step 622), the impulse authorization is stored within the subscriber equipment memory. At step 626 the stored authorization is used along with the embedded descrambling messages within the streamed content to descramble and present the desired content. That is, at step 626 the subscriber equipment utilizes the embedded authorization and descrambling messages within the streaming content to descramble that content and present the descrambled content on, e.g., a display device.

At step 628, upon concluding the presentation of the desired content, the subscriber equipment requests that the session be terminated. At step 630 the service provider equipment receives a session termination request from the subscriber equipment. At step 632 a service provider equipment stops streaming the requested content and injecting impulse authorization messages (IAM) and descrambling messages (DM). At step 634, the service provider equipment causes the conditional access system to stop scrambling content on the defined channel. At step 636 the service provider equipment releases the defined channel such that the channel may be utilized by another session between the service provider equipment and another subscriber.

It should be noted that while the steps comprising the methods 400 and 600 of, respectively, FIG. 4 and FIG. 6 are depicted as being in a particular order, variations of that order are contemplated by the inventor and are within the scope of the invention. For example, the steps of providing an identifier for a channel to transmit content (414; 614) and receiving said channel identifier (416,616) may be included within the steps of establishing a session (406-407, 606-608). Additionally, an information request may be made (410,610) and processed (412,612) before or after a channel is defined (414, 614).

Although various embodiments which incorporate the teachings of the present invention have been shown and described in detail herein, those skilled in the art can readily devise many other varied embodiments that still incorporate these teachings.

What is claimed is:

1. A conditional access control apparatus, comprising:
    a pre-encryption module, for retrieving un-encrypted content, encrypting content to form pre-encrypted content, embedding a descrambling message with a descrambling key and an impulse authorization into a encrypted content stream with the pre-encrypted content and associating an event identifier with the encrypted content stream associated with the pre-encrypted content before said pre-encrypted content is requested by a requesting subscriber, the event identifier linking the encrypted content steam associated with the pre-encrypted content with the embedded descrambling message and impulse authorization;
    a content and asset module, for storing the encrypted content stream associated with the pre-encrypted content after the retrieved un-encrypted content has been encrypted to form the pre-encrypted content and a descrambling message and impulse authorization has been embedded therewith;
    a transport processor configured to insert the encrypted content stream associated with the pre-encrypted content stored in the content and asset module into a forward application transport channel (FATC); and
    a controller, for receiving a request from a subscriber identifying content by an event identifier, receiving event identifiers from the pre-encryption module, processing the event identifiers received from the pre-encryption module to identify the encrypted content stream stored in the content and asset module having an event identifier matching the event identifier of the content requested by the subscriber, transmitting a signal to the subscriber indicating a FATC for the subscriber to tune to for receiving the requested content, initiating transfer of the identified encrypted content stream from the content and asset module to the transport processor, causing the transport processor to modulates the encrypted content stream onto a carrier frequency associated with the FATC indicated to the subscriber, wherein the event identifier associated with the content request is used to determine the impulse authorization associated with the encrypted content stream for authorizing use of the key in the descrambling message to decrypt the pre-encrypted content in the encrypted content stream received via the FATC.

2. The apparatus of claim 1, wherein said content comprises audio and video content.

3. The apparatus of claim 1, wherein said controller comprises a session controller communicating with said content and asset storage module, said pre-encryption module, said transport processor, and a distribution network via said FATC.

4. The apparatus of claim 1, wherein said descrambling messages and impulse authorizations are repeatedly inserted into said FATC for a predefined amount of time.

5. The apparatus of claim 1, wherein said transport processor is coupled to a distribution network via said FATC for sending said requested scrambled content.

6. The apparatus of claim 5, wherein said distribution network is a hybrid fiber channel distribution network.

7. A method of providing conditional access control, comprising:
    retrieving un-encrypted content,
    encrypting the retrieved unencrypted content to form pre-encrypted content, and embedding a descrambling message with a descrambling key and an impulse authorization into an encrypted content stream with the pre-encrypted content and associating an event identifier with the encrypted content stream associated with the pre-encrypted content before the pre-encrypted content is requested by a subscriber, the event identifier linking the encrypted content steam associated with the pre-encrypted content with the embedded descrambling message and impulse authorization;

storing the encrypted content stream associated with the pre-encrypted content in a storage module after the retrieved un-encrypted content has been encrypted to form the pre-encrypted content and a descrambling message and impulse authorization has been embedded therewith;

receiving a request from a subscriber identifying content by an event identifier;

receiving event identifiers from the pre-encryption module, processing the event identifiers received from the pre-encryption module to identify the encrypted content stream stored in the content and asset module having an event identifier matching the event identifier of the content requested by the subscriber;

transmitting a signal to the subscriber indicating an application transport channel (FATC) for the subscriber to tune to for receiving the requested content;

transferring the identified encrypted content stream from the storage module to a transport processor;

modulating the encrypted content stream onto a carrier frequency associated with the FATC indicated to the subscriber;

identifying, at a subscriber terminal of the requesting subscriber, an impulse authorization that matches the determined event identifier associated with the encrypted content stream;

using the impulse authorization to authorize use of the key in the descrambling message to descramble the pre-encrypted content in the encrypted content stream received via the FATC; and presenting the descrambled content.

8. The method of claim 7, further comprising:

storing the impulse authorization in the subscriber terminal.

9. The method of claim 7, further comprising:

providing to the subscriber terminal a channel identifier defining the channel for streaming the pre-encrypted content.

10. The method of claim 9, further comprising:

receiving a termination request from the subscriber terminal; and terminating the streaming of the pre-encrypted content to the subscriber terminal.

11. The method of claim 10, further comprising:

releasing the channel defined by the channel identifier.

12. The method of claim 7, wherein the content comprises audio and video content.

* * * * *

UNITED STATES PATENT AND TRADEMARK OFFICE
CERTIFICATE OF CORRECTION

| | |
|---|---|
| PATENT NO. | : 7,975,280 B2 |
| APPLICATION NO. | : 10/359106 |
| DATED | : July 5, 2011 |
| INVENTOR(S) | : Bertram |

It is certified that error appears in the above-identified patent and that said Letters Patent is hereby corrected as shown below:

Col. 12, line 40, claim 1: "processor to modulates the encrypted" should read --processor to modulate the encrypted--

Col. 13, line 7, claim 7: "encrypted content steam associated" should read --encrypted content stream associated--

Signed and Sealed this
Twentieth Day of November, 2012

David J. Kappos
*Director of the United States Patent and Trademark Office*